US008133400B2

(12) United States Patent
Kee et al.

(10) Patent No.: US 8,133,400 B2
(45) Date of Patent: Mar. 13, 2012

(54) PORTABLE OZONATION APPARATUS FOR STORING AND PURIFYING LIQUID

(75) Inventors: Timothy A. Kee, Stevensville, MI (US); Paul W. Barnett, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 806 days.

(21) Appl. No.: 11/834,803

(22) Filed: Aug. 7, 2007

(65) Prior Publication Data

US 2009/0039033 A1 Feb. 12, 2009

(51) Int. Cl.
C02F 1/78 (2006.01)
(52) U.S. Cl. .................. 210/760; 210/764; 210/192
(58) Field of Classification Search .................. 210/760, 210/749, 764, 172.1, 172.6, 192, 205, 198.1, 210/241; 422/28, 29
See application file for complete search history.

(56) References Cited

U.S. PATENT DOCUMENTS

| 2,566,371 A | 9/1951 | Quinn |
| 2,670,081 A | 2/1954 | Quinn |
| 3,726,404 A | 4/1973 | Troglione |
| 4,019,986 A * | 4/1977 | Burris et al. .................. 210/192 |
| 4,714,550 A | 12/1987 | Malson et al. |
| 5,106,495 A | 4/1992 | Hughes |
| 5,186,830 A | 2/1993 | Rait |
| 5,486,285 A | 1/1996 | Feeney |
| 5,685,980 A | 11/1997 | Patapoff et al. |
| 5,800,741 A | 9/1998 | Glenn et al. |
| 5,846,418 A | 12/1998 | Thompson et al. |
| 5,900,143 A | 5/1999 | Dalton et al. |
| 5,911,957 A | 6/1999 | Khatchatrian et al. |
| 5,914,045 A | 6/1999 | Palmer et al. |
| 5,922,378 A | 7/1999 | Kagan et al. |
| 5,961,326 A | 10/1999 | Johnston et al. |

(Continued)

FOREIGN PATENT DOCUMENTS

DE 19911443 9/2000

(Continued)

OTHER PUBLICATIONS

Muthukumar et al., "*Optimisation of Ozone Treatment for Colour and COD Removal of Acid Dye Effluent Using Central Composite Design Experiment*", Dyes and Pigments, Elsevier Applied Science Publishers, vol. 63, No. 2, Nov. 2004, pp. 127-134.

(Continued)

*Primary Examiner* — Nam Nguyen
*Assistant Examiner* — Lucas Stelling
(74) *Attorney, Agent, or Firm* — John W. Morrison; Kirk W. Goodwin; Diederiks & Whitelaw, PLC

(57) ABSTRACT

A portable ozonation apparatus for storing and purifying liquids includes a container having an opening for receiving a liquid and a treatment cap. The treatment cap is preferably detachably mounted to the container at the opening. Preferably, the treatment cap includes a main body portion having provided therein an electricity generating device and an ozone generating device. With this arrangement, un-purified liquid, such as water, is introduced into the container. The container is then inverted to bring the un-purified liquid into contact with the ozone generating device. At this point, the electricity generating device is activated to deliver an electrical current to the ozone generating device. Once powered, the ozone generating device produces ozone which is introduced into the liquid container. The ozone gas transforms un-purified liquid into a purified liquid suitable for consumption.

6 Claims, 2 Drawing Sheets

U.S. PATENT DOCUMENTS

| | | |
|---|---|---|
| 5,997,750 A | 12/1999 | Rozelle et al. |
| 6,042,720 A | 3/2000 | Reber et al. |
| 6,180,003 B1 | 1/2001 | Reber et al. |
| 6,299,770 B1 | 10/2001 | Diener et al. |
| 6,391,259 B1 | 5/2002 | Malkin et al. |
| 6,527,109 B2 | 3/2003 | Schoo et al. |
| 6,565,743 B1 | 5/2003 | Poirier et al. |
| 6,589,479 B2 | 7/2003 | Dufresne et al. |
| 6,827,874 B2 | 12/2004 | Souter et al. |
| 6,919,022 B2 | 7/2005 | Cluff et al. |
| 2002/0185423 A1 | 12/2002 | Boyd et al. |
| 2004/0011665 A1 | 1/2004 | Koizumi et al. |
| 2006/0163174 A1 | 7/2006 | Namespetra et al. |
| 2006/0165571 A1 | 7/2006 | Seon |
| 2006/0191824 A1 | 8/2006 | Arett et al. |

FOREIGN PATENT DOCUMENTS

| | | |
|---|---|---|
| GB | 2215325 | 9/1989 |
| GB | 2228260 | 8/1990 |
| GB | 2312175 | 10/1997 |
| WO | 02/42216 | 5/2002 |
| WO | 2004/063100 | 7/2004 |
| WO | 2005/054545 A1 | 6/2005 |

OTHER PUBLICATIONS

Machine Translation of DE 19911443, Sep. 2000 (translation obtained Sep. 2011 espacenet).

* cited by examiner

PORTABLE OZONATION APPARATUS FOR STORING AND PURIFYING LIQUID

BACKGROUND OF THE INVENTION

1. Field of the Invention

The present invention pertains to the art of liquid purification devices and, more particularly, to a portable ozonation apparatus for storing and purifying liquids.

2. Description of the Related Art

Filtration and disinfecting systems are employed to provide cleaner, safer water for drinking and other uses. Most portable filtration systems used for camping or hiking are pump-style systems which include a number of components that must be assembled before, and disassembled after, each use. For example, many of the pump-style systems require separate containers, multiple hoses and pumps that must be routinely connected prior to each use and disconnected before packing the system away for travel. Many users have difficulty obtaining an adequate volume of water from such systems due to clogged filters. In addition, filters in such devices typically have limited life-spans resulting in significant costs associated with maintaining the systems. The need for replacement filters is of particular concern in disaster-type situations where potable water and spare filters are scarce.

In order to obtain an adequate volume of safe drinking water, chemical disinfectants, such as iodine and chlorine, are often utilized. However, chemical disinfectants can have a detrimental effect on the taste and smell of the fluid. Thus, in order to provide an adequate water supply that is both potable and appealing to the senses, other non-chemical disinfecting methods, such as ultraviolet radiation and ozonation, have recently become more popular. Unfortunately, such systems are not usually designed for a user who is traveling, hiking or otherwise on the move.

Ozone is one of the strongest oxidizing agents that is readily available and easily produced for use in treating fluid. Ozone is useful in eliminating organic waste and reducing color, odor and total organic carbon. In addition, ozone kills bacteria, viruses and other microorganisms more effectively and more quickly then ultraviolet light or chemicals, such as iodine and chlorine. Of course, the effectiveness of ozone treatment, as well as the processing time required for treatment, is dependent upon the quality of the fluid being treated. High levels of sediment in the fluid may contain high levels of metals, organic fluid and carbons, which may require a longer ozone treatment period.

Based on the above, despite the existence of water purification devices in the prior art, there still exists a need in the art for an ozone purification system. More specifically, there exists a need for a portable ozone purification system that is readily adapted to outdoor or transitory settings and which can provide an adequate supply of potable drinking water having both a pleasant taste and pleasant smell.

SUMMARY OF THE INVENTION

The present invention is directed to a portable ozonation apparatus for storing and purifying liquids. The portable ozonation apparatus includes a container having an opening for receiving a liquid and a cap including a self-contained ozone generating system. More specifically, the cap includes a main body portion having provided therein both an electricity generating device and an ozone generating device.

In further accordance with the invention, the electricity generating device includes an activating mechanism and an output terminal connected to the ozone generating device. The activating mechanism selectively establishes a flow of electricity through the output terminal to the ozone generating device. Preferably, the ozone generating device includes an input terminal and is detachably mounted to the main body portion of the cap. Most preferably, when the ozone generating device is properly seated, a circuit, connecting the input and output terminals, is completed. With this arrangement, un-purified liquid is introduced into the container. The container is inverted to bring the un-purified liquid into contact with the cap and the ozone generating device. At this point, the electricity generating device is activated to deliver an electrical current to the ozone generating device. Once powered, the ozone generating device produces ozone which is introduced into the container and diffused through the liquid. During a treatment period, the ozone transforms the un-purified liquid into a purified liquid suitable for human consumption.

In accordance with one aspect of the invention, the electricity generating device constitutes a hand cranked generator. When operated, the hand cranked generator delivers an electrical current to the ozone generating device. In this manner, the portable ozonation apparatus does not require a separate power supply, such as a battery, thereby making the device extremely portable and adaptable to emergency situations. In accordance with another aspect of the invention, the cap is provided with a plurality of threads designed to cooperate with corresponding threads provided on standard drinking bottles such as those formed from Nalgene®.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF PREFERRED EMBODIMENTS

Figure 1:
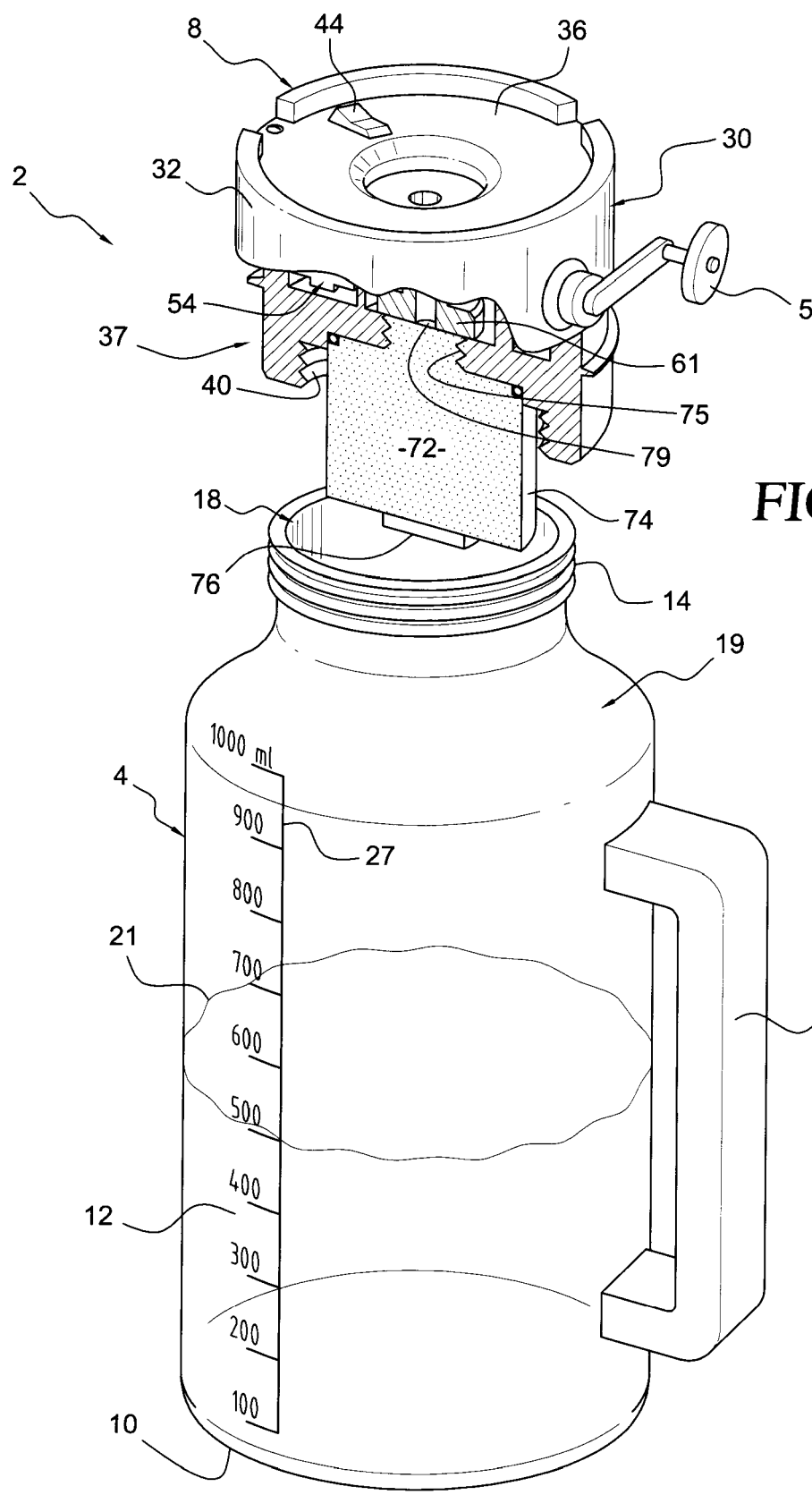
FIG. 1 is an upper, partial cross-sectional, perspective view of a portable ozonation apparatus constructed in accordance with the present invention.

With initial reference to FIG. 1, a portable ozonation apparatus for storing and disinfecting a fluid constructed in accordance with the present invention is generally indicated at 2. Ozonation apparatus 2 includes a container 4 and self-contained ozone generating system in the form of a removable treatment cap 8. Container 4 is preferably formed from plastic, such as Nalgene® and includes a bottom wall portion 10 and a side wall portion 12. Side wall portion 12 extends upward from bottom wall portion 10 to a threaded neck portion 14 which defines an opening 18. In a manner known in the art, bottom, side wall and neck portions 10, 12 and 14 define an interior storage/treatment area 19 for receiving a fluid 21. Also shown in FIG. 1, a handle 25 is provided on side wall portion 12 to enable a user to readily grasp container 4 and activate ozonation apparatus 2 in a manner that will be described more fully below. Finally, container 4 is shown to include a scale or level indicia 27 which allows a user to determine how much fluid 21 is present within interior storage/treatment area 19. As will be discussed more fully below, fluid 21 is initially a raw or non-potable fluid, however, after treatment, fluid 21 becomes a potable liquid suitable for consumption.

In accordance with the invention, treatment cap 8 includes a main body portion 30 having an exterior side wall 32 including a lower edge portion 33 and a top wall 36 that define an interior cavity 37. Lower edge portion 33 is provided with a plurality of internal threads 40 which are adapted to matingly engage with threaded neck portion 14 of container 4. Treatment cap 8 is also shown to include a power switch 44 which, as will be discussed more fully below, enables activation of ozonation apparatus 2.

In further accordance with the invention, ozonation apparatus 2 includes an electricity generating device 54 mounted within treatment cap 8. Electricity generating device 54 preferably takes the form of a generator which, in the embodiment shown, is operated by a hand crank 58. More specifically, upon activation of switch 44 and rotation of hand crank 58, electricity generating device 54 creates an electrical current that passes to an output terminal 61. Output terminal 61 preferably includes both positive and negative electrodes (not separately labeled). However, it should be understood that one electrode, for example the negative electrode, could be provided elsewhere in treatment cap 8.

In still further accordance with the invention, ozonation apparatus 2 includes an ozone generator 72 that is detachably mounted within interior cavity 37 of treatment cap 8. Ozone generator 72 includes a main body 74 having a first or threaded portion 75 and a second or discharge portion 76. Threaded portion 75 includes an input terminal 79 that is adapted to engage with output terminal 61 of electricity generating device 54 when ozone generator 72 is properly seated within treatment cap 8. Input terminal 79 of ozone generator 72 can include both positive and negative electrodes or simply a single electrode with a second electrode, such as ground, being provided by upper threaded portion 75.

Figure 2:
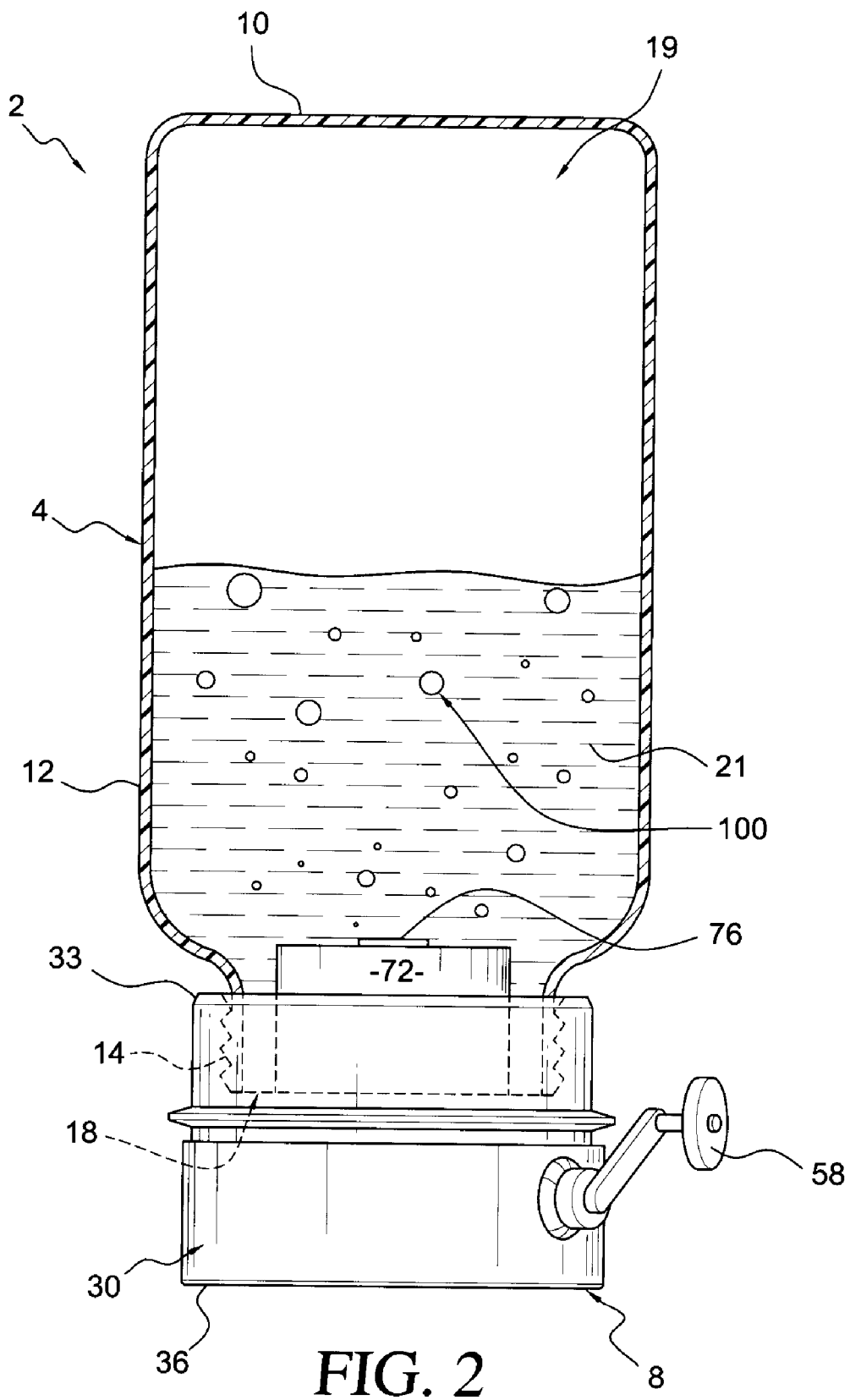
FIG. 2 is a cross-sectional side view of the portable ozonation apparatus of FIG. 1.

The present invention enables a user to readily and quickly purify an amount of fluid 21 stored within container 4. More specifically, upon placing an amount of fluid 21, such as unpurified water, within container 4, treatment cap 8 is installed over opening 18 with ozone generator 72 extending into storage/treatment area 19. At this point, container 4 is inverted, such as shown in FIG. 2, and switch 44 activated. Once switch 44 is in the "on" position, hand crank 58 is rotated, causing electricity generating device 54 to power ozone generator 72. Once powered, ozone generator 72 outputs ozone gas, indicated by bubbles 100, through discharge portion 76. The ozone gas then diffuses through fluid 21. More specifically, the ozone gas bubbles or diffuses through fluid 21 killing bacteria, microorganisms and the like to quickly transform fluid 21 into a potable liquid. At this point, it should be understood that the portable ozonation apparatus constructed with the present invention, provides for an easily operated convenient apparatus for purifying a liquid such as for camping, emergency situations and the like, without the need of chemical agents that might affect the taste and/or smell of the liquid.

Although described with reference to a preferred embodiment of the invention, it should be readily understood that various changes and/or modifications can be made to the invention without departing from the spirit thereof. For instance, while described as employing hand cranked generator, various other electricity generating devices such as batteries can also be employed. In addition, while treatment cap 8 is shown to include an activation switch 44, in the case of a hand crank generator, the activation switch is not necessary but merely serves as a redundant system to ensure that ozonation apparatus 2 is not inadvertently activated. Finally, while the container is described as being formed from plastic, various other materials such as glass, stainless steel, aluminum, and the like components are also acceptable. In general, the invention is only intended to be limited by the scope of the following claims.

What is claimed is:

1. A method of purifying a liquid in a portable container comprising:

introducing an un-purified liquid into the portable container;

closing the portable container with a treatment cap having contained therein an electrical generating device and an ozone generating device;

inverting the portable container causing the un-purified liquid to come in contact with the treatment cap;

activating the electrical generating device to deliver an electrical current to the ozone generating device and cause the ozone generating device to produce ozone gas; and delivering the ozone gas produced by the ozone generating device into the container to transform the un-purified liquid into a purified liquid.

2. The method of claim 1, wherein transforming the un-purified liquid into a purified liquid includes bubbling the ozone through the unpurified liquid.

3. The method of claim 1, further comprising: attaching the ozone generating device to the treatment cap such that an output portion of the ozone generating device extends into the portable container.

4. The method of claim 3, wherein attaching the ozone generator to the treatment cap completes an electrical circuit, with the electrical generating device enabling the ozone generating device to receive power.

5. The method of claim 1, further comprising: activating a switch to complete an electrical circuit between the electrical generating device and the ozone generating device.

6. The method of claim 1, wherein the electrical generating device is activated through operation of a hand crank.

* * * * *